Figure 1:
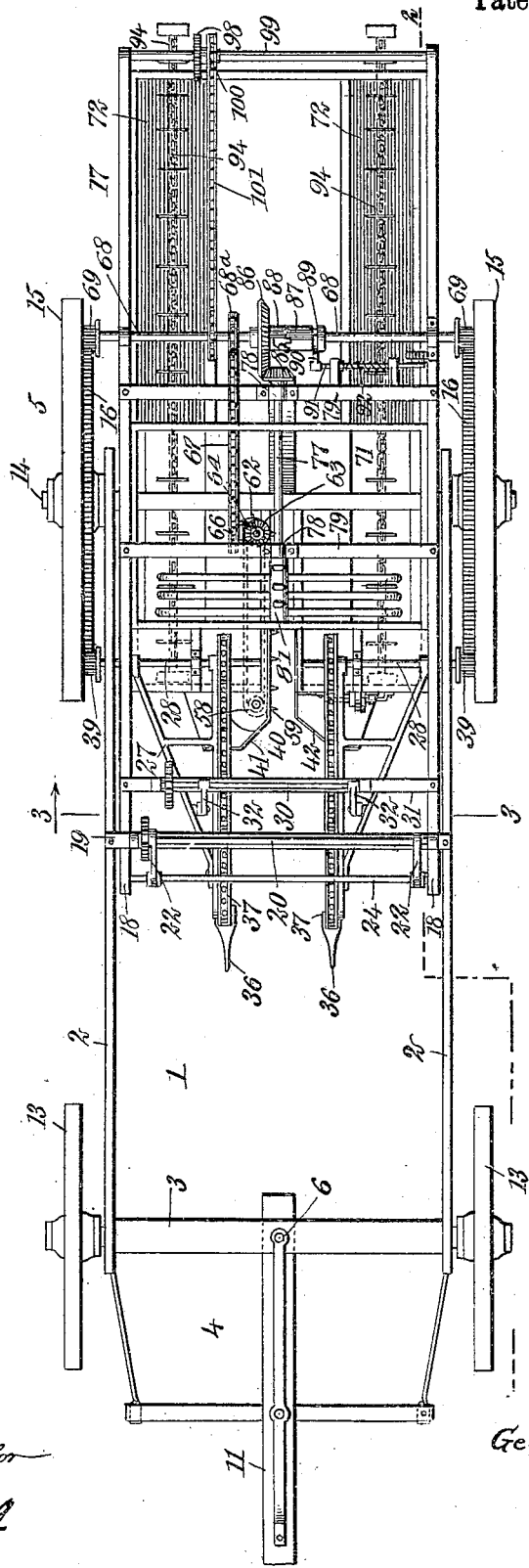

G. E. PRITCHARD.
PEA HARVESTER.
APPLICATION FILED MAR. 16, 1909.

955,684.

Patented Apr. 19, 1910.
4 SHEETS—SHEET 1.

WITNESSES
Geo W Naylor
H Whiting

INVENTOR
George E. Prichard
BY Munn & Co
ATTORNEYS

G. E. PRITCHARD.
PEA HARVESTER.
APPLICATION FILED MAR. 16, 1909.

955,684.

Patented Apr. 19, 1910.

4 SHEETS—SHEET 3.

WITNESSES
Geo. W. Naylor
H. Whiting.

INVENTOR
George E. Pritchard
BY Munn & Co
ATTORNEYS

G. E. PRITCHARD.
PEA HARVESTER.
APPLICATION FILED MAR. 16, 1909.
955,684.
Patented Apr. 19, 1910.
4 SHEETS—SHEET 4.
Fig. 5.
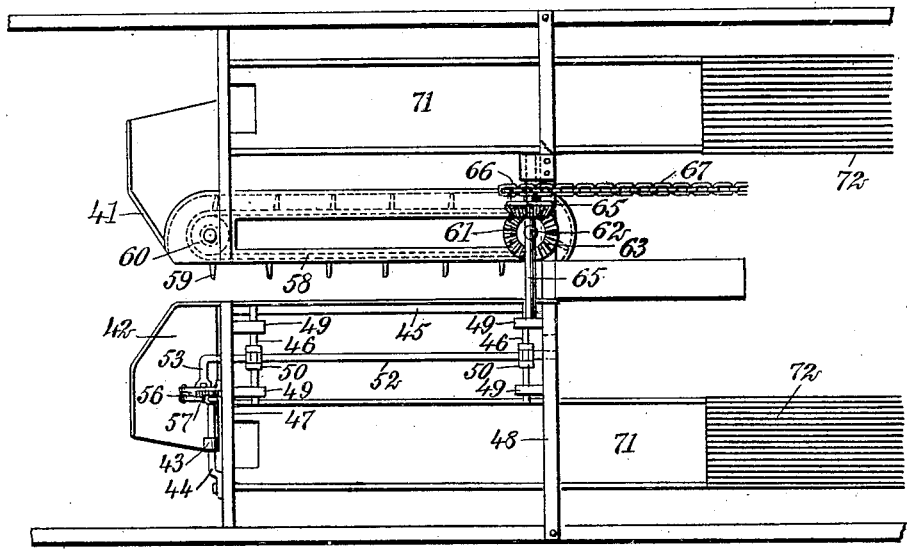
Fig. 6.
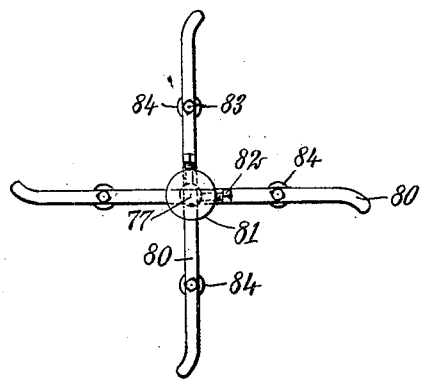
Fig. 7.
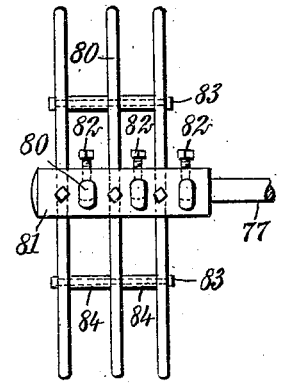
Fig. 8.
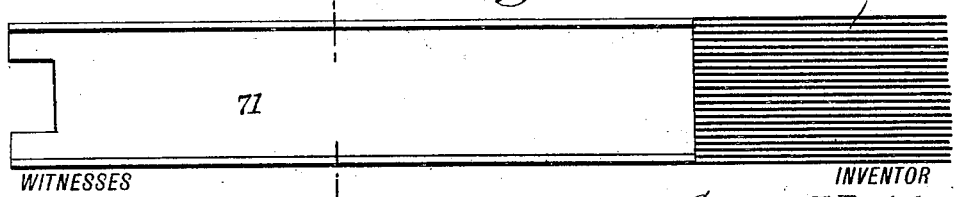
Fig. 9.
WITNESSES
Geo. W. Naylor
H. Whiting
INVENTOR
George E. Pritchard
BY Munn & Co.
ATTORNEYS

UNITED STATES PATENT OFFICE.

GEORGE EDWARD PRITCHARD, OF LILLY, NORTH CAROLINA.

PEA-HARVESTER.

955,684.　　　　　　　Specification of Letters Patent.　　Patented Apr. 19, 1910.

Application filed March 16, 1909. Serial No. 483,687.

*To all whom it may concern:*

Be it known that I, GEORGE E. PRITCHARD, a citizen of the United States, and a resident of Lilly, in the county of Camden and State of North Carolina, have invented a new and Improved Pea-Harvester, of which the following is a full, clear, and exact description.

This invention relates to machines for harvesting peas, rice and the like, either from vines or stalks. It is of that type of device which is adapted to rake over the rows of plants, scoop in the vines, strip the peas or rice from the plants and then separate the peas or rice from the refuse.
The object of this invention is to construct a simple and efficient harvester, which will gather the peas or rice readily and drop them cleanly into a proper receptacle.

The invention further consists in the construction and combination of parts to be more fully set forth hereinafter and pointed out in the claims.

Reference is to be had to the accompanying drawings, forming a part of this specification, in which like reference characters denote corresponding parts in all the views, and in which—

Figure 2:
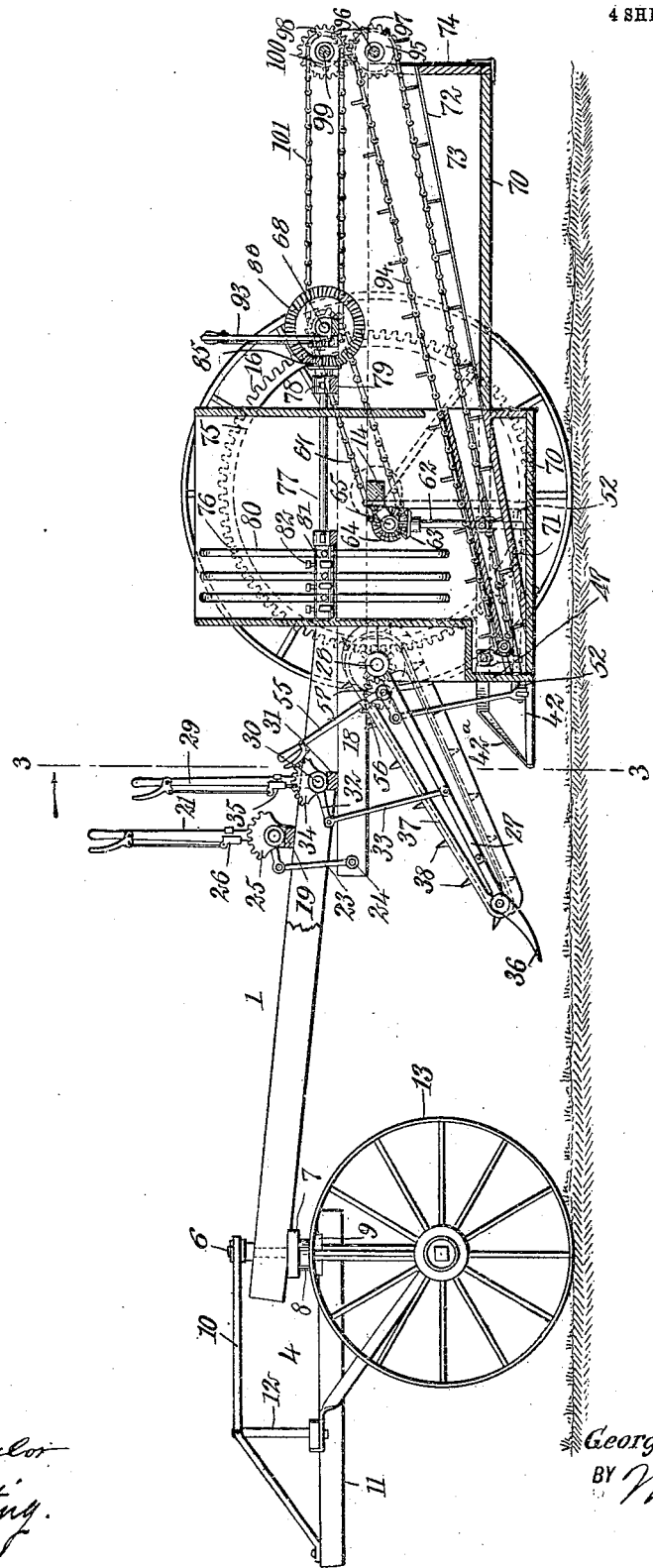
Figure 3:
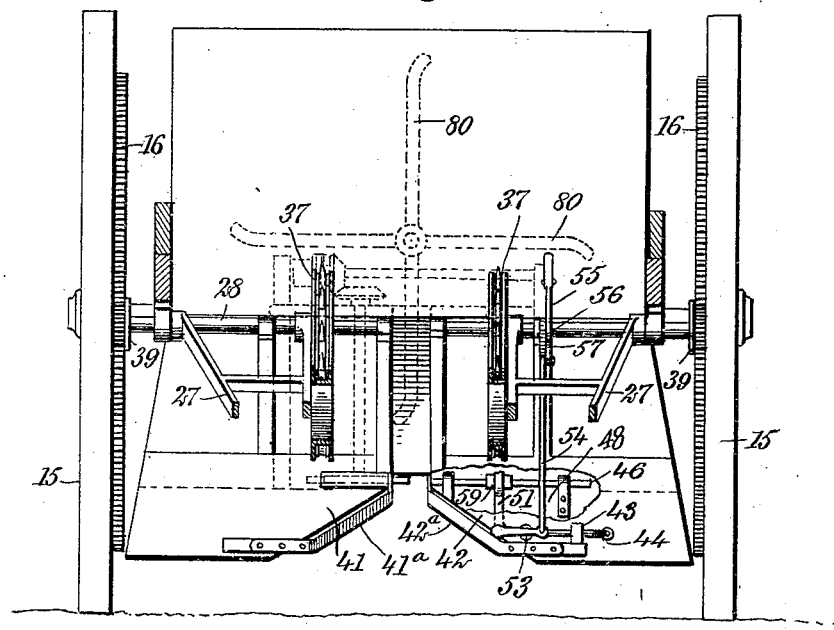
Figure 4:
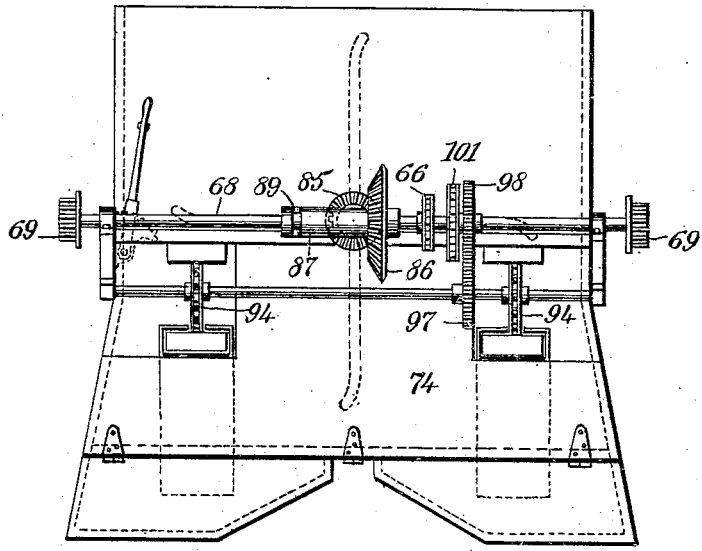

Figure 1 is a plan view of the harvester; Fig. 2 is a vertical longitudinal section on the line 2—2 in Fig. 1; Fig. 3 is a vertical transverse section on the lines 3—3 in Figs. 1 and 2; Fig. 4 is a rear view in elevation, parts being omitted for the sake of simplicity; Fig. 5 is a plan view showing details of the vine feeding mechanism; Fig. 6 is an end view of the stripper or beater; Fig. 7 is a side view of the same; Fig. 8 is a plan view of one of the guides employed, and Fig. 9 is a transverse section on the line 9—9 in Fig. 8.

Referring more particularly to the separate parts of the device, 1 is the frame of the device and consists of side pieces 2, and an end piece 3, the whole being supported at the front by the carriage 4 and at the rear by the carriage 5. The frame 1 is connected to the front carriage 4 by means of a king bolt 6, which passes through apertures in the end piece 3 and in the carriage 4. The end piece 3 and the carriage 4 are separated from each other by washers 7, 8 and 9, carried on the king bolt 6 and the latter is held in a substantially vertical position by a brace 10, which is fastened to the base 11 of the carriage 4 by any suitable means, and is reinforced by a strut 12, and the whole fore carriage is supported on wheels 13.

The rear carriage consists of a frame 14 which is supported by wheels 15, these wheels having on their inner sides integral therewith, gears 16. These gears 16 are adapted to drive the mechanism to be more fully described hereinafter.

Pivotally mounted on the rear carriage 5 is a harvester frame 17. This frame has forwardly extending arms 18 which run parallel to the side pieces 2 of the frame 1. Supported in any suitable manner on the side pieces 2 is a cross bar 19, and on this cross bar 19 is pivotally secured in any suitable manner a shaft 20. This shaft 20 has connected to it a lever 21 which is adapted to rotate the same. Also fixed to the shaft is a pair of arms 22, which are pivotally connected by means of links 23 with a cross bar 24 on the forwardly extending arms 18. On the cross bar 19 is a sector rack 25, with which is adapted to engage a latch 26 on the lever 21. This whole device is adapted to regulate the elevation of the forward ends of the arms 18, and thus the whole carriage 17 is made adjustable relative to the frame 1, and is adapted to be locked in any position of adjustment.

Connected to the forward end of the carriage 17 is a gathering frame or gatherer 27, formed of a pair or reinforced V-shaped braces, pivotally secured in any suitable manner, as by means of the shaft 28, to the frame 17. This gathering frame 27 is adjustable relative to the frame 17 on its pivot shaft 28 by means of a lever 29. This lever 29 is fixed to a shaft 30, which is rotatably supported on a cross piece 31, which is in turn supported by the forwardly extending arms 18. Extending at an angle to the lever 29 and secured to the shaft 30, is a pair of levers 32, connected to the guide frame 27 by means of connecting links 33. On the cross piece 31 is also mounted a gear sector 34, which is adapted to be engaged by the locking latch 35 on the lever 29. Thus the angle of inclination, and the elevation of the forward end of the gathering frame 27 may be adjusted relative to the frame 17 and the frame 27 locked in any adjusted position.

The gathering frame 27 is formed in two parts with a passageway between them. On the forward extremities of the gathering frame are mounted downwardly curved prongs 36, adapted to slip under the branches of the vines or the plant to be stripped, and guide them to a pair of conveyers 37, which are suitably supported on the gathering frame 27. These conveyers 37 are in the form of endless chains passing over sprocket wheels suitably supported on the guide frame 27. These chains have outwardly extending fingers 38 which are adapted to engage the overhanging branches of the vines to be stripped, and convey them toward the stripping part of the machine. The rear sprocket wheels which drive these chains 37 are fixed on the shaft 28, which is adapted to be rotated by pinions 39 fixed on the ends of the shaft, and meshing with the gears 16 fixed on the rear wheels 15 of the rear carriage. Just below the gathering frame 27, and extending forward from the frame 17 is a feeder 40. This feeder 40 consists of a pair of inwardly inclined guides or deflectors 41 and 42, suitably supported by the bottom of the frame 17. Between these deflectors is a passage way through which the stalks of the plants are fed to the stripping mechanism farther along. One of these guiding deflectors 42 is adjustable relative to the frame 17 and to the other deflector, in order to vary the width of the opening between said deflectors.

The adjustable guide deflector 42 is slidingly supported on the forward end of the frame 17, in any suitable manner, as by means of a slide 43 moving on a guide 44, which is fastened to the forward end of the frame 17 in any suitable manner. (See Figs. 3 and 5.) This deflector 42 extends inwardly along the path in which the stalks pass, in the form of an inner spring strip 45, as shown in Fig. 5. This strip is supported by means of the rods 46, sliding in the guides 49, which are suitably supported on the cross pieces 47 and 48 on the frame 17. These rods 46 have slotted collars 50 fixed thereon. Fitted in the slots of these collars 50, and adapted to slide the rods 46, are bifurcated throwing arms 51. These throwing arms 51 are fixed to a longitudinal shaft 52, pivotally supported in the frame 17. This shaft 52 has a right angle bend 53, which is operated through the connecting link 54 by a lever 55. This lever 55 is adapted to rotate the shaft 52 and thus slide the rods 46 in and out and so adjust the opening between the guiding deflectors 41 and 42. This lever 55 has a catch 56, which is adapted to engage a fixed sector rack 57 and lock it in any adjusted position. Coacting with the deflectors 41 and 42 on the side on which the guide 41 is placed, is an endless feed conveyer 58. This endless feed conveyer 58 consists of an endless chain having outwardly extending prongs 59 which are adapted to engage the stalks passing between the guides and to feed them toward the stripper. This endless chain conveyer 58 is supported on sprocket wheels 60 and 61. The sprocket wheel 61 is fixed to a vertical shaft 62 which has a beveled gear 63 fastened thereon. This beveled gear 63 meshes with a beveled gear 64 on a shaft 65, which is rotatably supported in bearings on the frame 17, and this shaft 65 has a sprocket wheel 66 thereon, which is adapted to be driven by an endless chain 67. This endless chain 67 passes over a sprocket wheel 68$^a$ on a shaft 68. This shaft 68 has on each end thereof pinions 69 which mesh with the gears 16 on the wheels 15; thus the feeding conveyer is driven by the wheels 15.

The harvesting frame 17 has a base 70, which is in the form of steps, the rear step being somewhat higher than the front step. Sloping upwardly from the front of the frame to the rear of the same is a pair of inclined guides 71; these inclined guides 71 are in the form of troughs, and at the first part of the rise are solid, but their upper part consists of tightly drawn longitudinal wires which form screens 72. Beneath these screens 72 are formed suitable receptacles 73, which have openings in the back which are adapted to be closed by suitably hinged doors 74.

Upon the base 70 of the frame 17 is erected a vertically inclosed box 75, which forms a casing for a feeder or stripper 76, fastened to a shaft 77, which extends longitudinally of the harvester frame 17, and is rotatably supported in any suitable manner, as by means of the bearings 78 on cross pieces 79. This stripper is composed of a series of beating arms 80, which are supported in slots in a head 81. These arms are held in position in these slots by any suitable means, such as the set screws 82. The arms 80 are curved in opposite directions at their extremities, so as to form suitable engaging hooks. Connecting the arms 80 are tie bolts 83, and suitable spacing sleeves 84 are placed on these tie bolts 83 between the arms to hold them apart. The head 81 is fastened in any suitable manner to the shaft 77. The beating arms 80 extend above the opening between the guiding deflectors 41 and 42, so that the vines and stalks as they are fed through come into the sphere of operation of these arms and are exposed to their stripping action. The shaft 77 to which the beating arms 80 are fastened, has a beveled pinion 85 fastened at its other end. This beveled pinion meshes with a beveled gear 86 loosely mounted on the shaft 68. Splined on this same shaft 68 is a clutch 87 which is adapted to engage a clutch 88 fixed to the beveled gear 86. The clutch 87 has a groove 89 which is adapted to fit a throwing arm 90, which is secured to a slidable rod 91 suitably supported on the cross piece 79. This slidable rod 91 is adapted to be operated against the tension of a spring 92 by means of a throwing lever 93. This throwing lever 93 has a latch thereon which is adapted to engage a fixed sector rack to lock the lever in any position. This lever 93 is adapted to throw the clutch 87 into and out of engagement with the clutch 88 on the beveled gear 86, thus making and breaking the driving connection between the gear 86 and the shaft 68 so that the beating arms 80 may be rotated at will.

Mounted directly above the guides 71 are the endless flight conveyers 94. These conveyers co-act with the troughs to carry the material stripped from the vines or stalks up over the screens 72 and throw the refuse vines over the end of the harvester, while the stripped peas or rice pass through the screens 72 into the receptacle 73 below. These conveyers 94 are mounted on sprocket wheels suitably supported on the frame 17, and are driven by rear sprocket wheels 95, which are fixed to a shaft 96. This shaft 96 has a gear 97 fixed thereon which engages with a gear 98 on a parallel shaft 99. This parallel shaft 99 is suitably supported in the frame 17 and has a sprocket wheel 100 fixed thereon. This sprocket wheel 100 is adapted to be driven from the shaft 68 by an endless chain 101. Thus the conveyers are also driven from the gears on the wheels 15.

The forward ends of the feed guiding pieces 41, 42 have upwardly and rearwardly extending bent metal strips 41ª, 42ª, which are adapted to yieldingly guide the material into the slot between them. The rear of this slotted opening slopes backwardly to allow the stalks to pass out under the harvester.

In the operation of the device the carriage is drawn by horses, mules or the like over a row of peas or rice which is to be gathered. The guiding plate 42 has been adjusted to a width suitable to the product to be harvested. The gatherers 27 and the carriage 17 are also adjusted to the height best suited for the material to be harvested. The machine in its travel forward gathers the vines by means of the prongs 36, and the conveyers 37 bend the stalks and pass them upwardly and force them between the gatherers, until they come in contact with the deflecting guides 41 and 42, where they are fed into the passage between them and pushed forward by the feed conveyer 58 until they come under the beating arms 80, where they are exposed to the rapid rotation of the same. These arms 80 strip the vines of the peas or rice, or whatever the article may be; the stalks of the vines pass out from the rear of the machine and the peas or rice fall into the troughs 71 and are carried by the flight conveyers 94 up over the screens 72, where the peas or rice fall through into the receptacle 73 and may be removed through the door 74. The conveyers 94 convey the waste material, such as stalks and pieces of vines which will not pass through the screens 72, up over the end of the harvester and drop them to the ground. The beating arms 80 may be rotated at will by means of the clutch throwing lever 93, which brings them into driving relation with the driving gears 16 on the wheels 15.

Having thus described my invention what I claim as new and desire to secure by Letters Patent is—

1. In a device of the class described, the combination with a carriage, of a pair of gatherers pivotally supported on said carriage, conveyers on said gatherers traveling in vertical planes, a feeder coacting with said gatherers having guides thereon, and a stripper coacting with said feeder.

2. In a device of the class described, the combination with a carriage of a harvester frame supported on said carriage, a gatherer on said frame, conveyers on said gatherer traveling in vertical planes, a feeder coacting with said gatherer, and a rotatable stripper coacting with said feeder, said feeder comprising guides and a feeding conveyer.

3. In a device of the class described, the combination with a carriage, of a gatherer supported on said carriage, downwardly-extending prongs supported on said gatherer, endless chain conveyers on said gatherer traveling in vertical planes, prongs on said conveyers, a feeder coacting with said gatherer, and a stripper coacting with said feeder, said feeder comprising guides and a conveyer having prongs thereon.

4. In a device of the class described, the combination with a carriage, of a gatherer supported on said carriage, and having conveyers thereon traveling in vertical planes, a feeder supported on said carriage, having a conveyer thereon traveling in a horizontal plane, a stripper on said carriage co-acting with said feeder, and a separator on said carriage.

5. In a device of the class described, the combination with a carriage, of a pair of gatherers supported on said carriage, a pair of conveyers on said gatherers traveling in vertical planes, a feeder coacting with said gatherers, said feeder comprising guides and an endless conveyer, a stripper coacting with said feeder, and a separator on said carriage.

6. In a device of the class described, the combination with a carriage, of a pair of gatherers pivotally supported on said carriage having a passageway between them, prongs on said gatherers, endless conveyers on said gatherers, a feeder coacting with said conveyers, said feeder comprising guides and a feed conveyer, means for adjusting said guides relative to each other, a stripper on said carriage coacting with said feeder, and a separator on said carriage.

7. In a device of the class described, the combination with a carriage, of a feeder on said carriage, said feeder comprising guides adjustable relatively to each other and a conveyer, a stripper on said carriage adapted to coact with said feeder, removable arms on said stripper, and a separator on said carriage.

8. In a device of the class described, the combination with a carriage, of a feeder on said carriage, said feeder comprising a pair of guides and an endless conveyer adapted to co-act with said guides, means for adjusting the relative position of said guides, a rotatable stripper on said carriage adapted to co-act with said feeder, said stripper comprising a rotatable shaft, a slotted head and removable arms adapted to fit the slots in said head, and a separator on said carriage.

9. In a device of the class described, the combination with a carriage, of a feeder supported on said carriage, said feeder comprising guides and an endless conveyer, means for adjusting said guides relative to each other, a stripper on said carriage adapted to coact with said feeder, said stripper comprising a rotatable shaft, a slotted head on said shaft and arms having curved ends and being adapted to fit into the slotted head, and conveyers on said carriage adapted to coact with said stripper.

10. In a device of the class described, the combination with a carriage, of a feeder on said carriage, said feeder comprising a pair of guides, one of said guides being adjustable relative to the other, a stripper on said carriage adapted to coact with said feeder, said stripper comprising a rotatable shaft, a slotted head on said shaft and arms having curved ends and being adapted to fit in said slotted head, an endless flight conveyer adapted to coact with said stripper, and a screen adapted to coact with said conveyer.

11. In a device of the class described, the combination with a carriage, of a pair of gatherers supported on said carriage having a passageway between them, forwardly extending prongs on the ends of said gatherers, endless conveyers on said gatherers, a feeder adapted to coact with said gatherers comprising a pair of guides having a passageway between them and means for adjusting one of said guides relative to the other, a stripper adapted to coact with said feeder, said stripper comprising a rotatable shaft, a slotted head on said shaft and arms having oppositely curved ends and being adapted to fit into said slotted head, and an endless flight conveyer on said carriage adapted to coact with said stripper.

12. In a device of the class described, the combination with a carriage, of a pair of gatherers on said carriage having a passageway between them, forwardly-extending prongs on said gatherers, endless chain conveyers on said gatherers, a feeder adapted to coact with said gatherers, said feeder comprising a pair of guides having a passageway between them and an endless conveyer, means for adjusting said guides one relative to the other, a stripper on said carriage adapted to coact with said endless conveyer, said stripper comprising a rotatable shaft, a slotted head and arms having oppositely curved ends and being adapted to fit into said slotted head, a pair of endless flight conveyers on said carriage adapted to coact with said stripper, and wire screens adapted to coact with said conveyers.

13. In a device of the class described, the combination with a carriage, of a frame adjustable relative to the carriage, means adapted to adjust said frame relative to the carriage, means for locking said frame in any adjusted position, and a stripper on said frame, said stripper comprising a rotatable shaft, a slotted head on said shaft, and arms having oppositely curved ends and being adapted to fit into said slotted head.

In testimony whereof I have signed my name to this specification in the presence of two subscribing witnesses.

GEORGE EDWARD PRITCHARD.

Witnesses:
J. W. LAYLER,
B. B. JAMES.